United States Patent
Schlichting et al.

(10) Patent No.: US 10,264,733 B2
(45) Date of Patent: Apr. 23, 2019

(54) BALING CHAMBER WITH PIVOTALLY MOUNTED CONVEYING UNIT

(71) Applicant: FORAGE INNOVATIONS B.V., Maassluis (NL)

(72) Inventors: Malte Cornelius Schlichting, Maassluis (NL); Jürgen Borchers, Maassluis (NL)

(73) Assignee: Forage Company B.V., Maassluis (NL)

( * ) Notice: Subject to any disclaimer, the term of this patent is extended or adjusted under 35 U.S.C. 154(b) by 803 days.

(21) Appl. No.: 14/769,522

(22) PCT Filed: Feb. 11, 2014

(86) PCT No.: PCT/NL2014/050080
§ 371 (c)(1),
(2) Date: Aug. 21, 2015

(87) PCT Pub. No.: WO2014/129890
PCT Pub. Date: Aug. 28, 2014

(65) Prior Publication Data
US 2016/0007540 A1    Jan. 14, 2016

(30) Foreign Application Priority Data
Feb. 22, 2013  (NL) .................................. 2010353

(51) Int. Cl.
*A01F 15/08* (2006.01)
*A01F 15/07* (2006.01)
*B30B 9/30* (2006.01)

(52) U.S. Cl.
CPC .......... *A01F 15/0883* (2013.01); *A01F 15/07* (2013.01); *B30B 9/3082* (2013.01);
(Continued)

(58) Field of Classification Search
CPC ................ A01F 15/0705; A01F 15/071; A01F 15/0883; A01F 2015/0735;
(Continued)

(56) References Cited

U.S. PATENT DOCUMENTS 4,402,176 A * 9/1983 Arnold .................... A01F 15/07
100/88
4,406,221 A   9/1983 Parrish et al.
(Continued)

FOREIGN PATENT DOCUMENTS

DE    31 46 304 A1    5/1983
DE    3146304 A1 *    5/1983  ............. A01F 15/07
(Continued)

*Primary Examiner* — Jimmy T Nguyen
*Assistant Examiner* — Gregory Swiatocha

(57) ABSTRACT

A baler baling chamber has a movable chamber part pivotally mounted at a fixed chamber part. Several conveying units convey the bale along a circumferential wall. The baler can be transferred into a bale ejecting mode by pivoting the movable chamber part away from the fixed chamber part. One conveying unit is mounted at the moveable chamber part and adjacent to the fixed chamber part. In a bale forming mode, the adjacent conveying unit engages into a receiving aperture in the fixed chamber part and conveys loose material into the bailing chamber. The adjacent conveying unit can be pivoted away from the fixed chamber part and out of the receiving aperture increasing the aperture for ejecting a bale out of the bale forming chamber as the adjacent conveying unit is pivoted out of the receiving aperture.

24 Claims, 8 Drawing Sheets

(52) U.S. Cl.
CPC .............. *A01F 2015/0775* (2013.01); *A01F 2015/0795* (2013.01)

(58) Field of Classification Search
CPC .......... A01F 2015/074; A01F 2015/075; A01F 2015/077; A01F 2015/0775; A01F 2015/078; A01F 2015/0785; A01F 2015/0795
See application file for complete search history.

(56) References Cited

U.S. PATENT DOCUMENTS

| | | | |
|---|---|---|---|
| 4,619,106 A * | 10/1986 | van der Lely | A01F 15/07 100/89 |
| 4,763,464 A * | 8/1988 | Mouret | A01F 15/07 100/88 |
| 6,463,714 B2 | 10/2002 | Viaud | |
| 7,024,989 B2 | 4/2006 | Preece | |
| 7,140,294 B1 | 11/2006 | Anstey et al. | |
| 8,261,512 B2 | 9/2012 | Gette et al. | |
| 8,281,713 B2 | 10/2012 | Viaud | |
| 8,910,460 B2 * | 12/2014 | Horstmann | A01F 15/0705 100/88 |
| 2002/0121200 A1 * | 9/2002 | Viaud | A01F 15/07 100/70 R |
| 2012/0137630 A1 | 6/2012 | McHale et al. | |
| 2012/0204739 A1 | 8/2012 | Beaufort | |

FOREIGN PATENT DOCUMENTS

| | | |
|---|---|---|
| DE | 10 2005 036 181 A1 | 2/2007 |
| EP | 0 894 428 A1 | 2/1999 |
| EP | 1 205 102 A2 | 5/2002 |
| EP | 1 264 531 B1 | 11/2007 |
| EP | 2 243 349 A2 | 10/2010 |
| WO | WO 03/039240 A1 | 5/2003 |

* cited by examiner

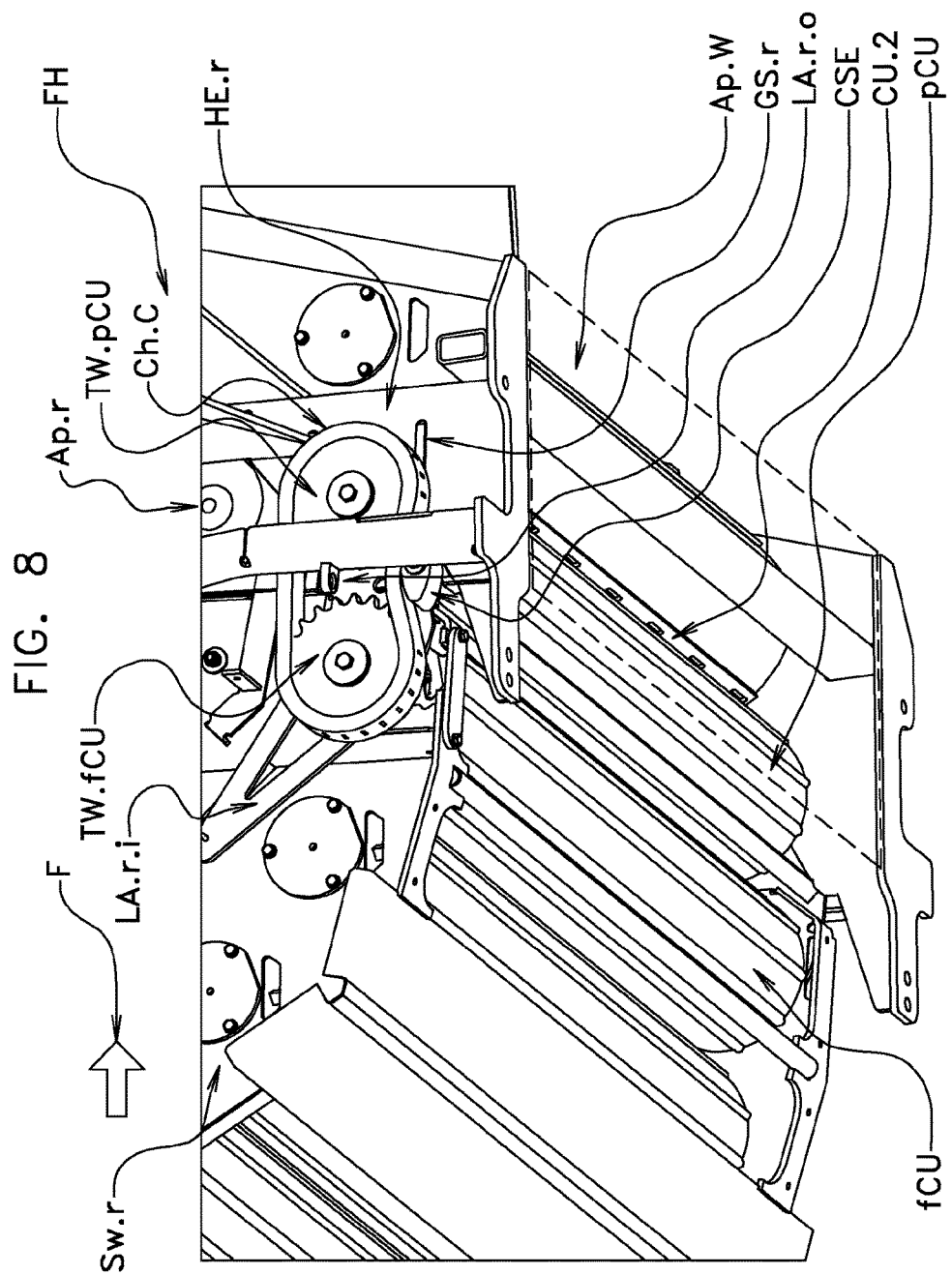

BALING CHAMBER WITH PIVOTALLY MOUNTED CONVEYING UNIT

BACKGROUND

The invention refers to an apparatus and a method which form a round bale in a baling chamber arrangement by means of several conveying units mounted at the baling chamber arrangement. Such apparatuses and methods are in use in particular for agricultural purposes (pressing hay, straw, silage, e.g.) since several years.

The invention solves the problem to reliably ejecting a bale out of the bale forming chamber even in an uphill direction, i.e. if the baling chamber arrangement is moved downhill and ejects a bale opposite to the travelling direction.

The skilled person distinguishes balers with fixed chambers and balers with variable chambers. The invention can be used in both kinds of round balers.

PRIOR ART

FIG. 1 of U.S. Pat. No. 4,619,106 shows a round baler in a side view. A pressing space 5 is surrounded by two side walls 4 and by a cylindrical further boundary. Every side wall 4 is divided into a fixed section 62 and a pivotal rear section 61 behind the fixed section 62—seen in the travelling direction. Hydraulic rams 64 can pivot the two rear sections 61 with respect to the two fixed front sections 62. Several cylindrical rollers 6 are driven around parallel axes 7. The rollers 6 of the rollers group 56 and the carriers 57 can be pivoted around the axis 7 of the lowermost roller 53, cf. the continuous and the dotted lines in FIG. 1.

Two rollers 59 and 60 are driven from a sprocket 51 by means of a chain 58, cf. col. 5/l. 10 ff. These rollers 59, 60 extend across the whole width of the bale forming space between the side walls 4. The rollers 59 and 60, the adjoining rollers group 56, and the rear sections 61 of the side walls 4 can be pivoted upwardly in the direction of the arrow B. A door for discharging a bale is provided. The rollers group 56 forms a part of the door and can be pivoted around the shaft 52 (through the lowermost roller 53) in a forward direction. An idler roller 63 is mounted in the fixed section 62 of the side walls 4. The lowermost roller 60 engage into the fixed section 62, cf. the side view of FIG. 7.

If a bale is completed, the rams 64 are actuated and open the door with the rear sections 61, the rollers 59 and 60, and the rollers group 56, cf. col. 6/l. 39-42. Opening the door causes the bale to be drawn rearwards out of the bale forming space 5.

In the embodiment of FIG. 1 of U.S. Pat. No. 4,619,106 a pushing member 44 with several pushing elements 65 is moved upwards. The tips of the elements 65 engage into the pressing space 5. The rotating pushing member 44 helps to wrap the bale. In the embodiment of FIG. 7 two binding mechanisms 69 wrap the bale.

DE 102005036181 A1 discloses a round baler ("Rundballenpresse 10") with a pressing chamber ("Pressraum 28") with two side walls ("Seitenwände 26") and several pressing elements ("Presselemente 22") having the forming of endless belts. The belts 22 are guided around rollers 20' which are stationary mounted, around rollers 20" mounted on a spring and around rollers 20''' mounted on a pivoting unit ("Schwenkteil 30"). The bale is further supported by starter rollers ("Starterrollen 36"). Every side wall 26 comprises a front part ("vorderer Abschnitt 62") and a rear part ("rückwärtiger Abschnitt 64") connected via an articulation ("Gelenk 66") with a horizontal pivoting axis 76. The rear part 64 is guided on an axle 44 rigidly mounted at the frame 12 of the baler 10. It is also possible to pivot the rear part 64 with respect to the front part 62 such that an opening pointing to below ("nach unten öffnende Divergenz") for ejecting a round bale is created, cf. [0032]. The pivoting unit 30 can be pivoting around a horizontal axis 34 and comprises at least one pivoting arm ("Schwenkarm 46") on every side and a cross bearing ("Traverse 48"). During creating a bale a pivoting unit 30 is in the lower position of FIG. 1 such that the cross bearing 48 is below the bale. For ejecting the bale the pivoting unit 30 is pivoted into the upper position of FIG. 4.

In U.S. Pat. No. 7,140,294 B1 a round baler ejecting apparatus with a variable pressing chamber is described. This baler presses bales by means of several bale-forming belts which are guided around movable rollers and fixed rollers. A tensioning arm can be pivoted between a lowered bale-starting position and a raised bale-completed position. FIG. 1 shows the baler with the pressing chamber 22 and a bale 24 and a discharge gate 52 which can be pivoted around a shaft 56. Triangular end members 54 outside the pressing chamber support pivoting the discharge gate 52. A completed bale 24 is ejected out of the chamber and through the opened gate 52. A tension and ejecting arrangement 70 with a rear tensioning arm assembly 74 exerts tension on the pressing belts and supports to eject the bale. The rear tensioning arm assembly 74 pivots and therefore pressures a belt 108 against the bale 24. This movement exerts a force onto the bale 24 which in turn pushes the belt out of the chamber.

In U.S. Pat. No. 7,024,989 B2 an ejection aid is described. A contact element is mounted at the rear part of one side wall. This contact element can be moved between an out-of service position and an active position. The contact element is moved into the active position before opening the tailgate. When being moved into the active position, the contact element penetrates the bale in the pressing chamber. When the tailgate is opened, the active element pulls the bale out of the pressing chamber. FIG. 3 shows a contact element 54.

U.S. Pat. No. 8,261,512 B2 describes an actively driven transfer device which transfers a bale from the pressing chamber onto a supporting table of a wrapping apparatus. A control unit controls the transfer of the bale to the wrapping device as a function of the inclination of the pressing chamber or the wrapping device with respect to the horizontal plane during downhill drive. This inclination is measured by an inclination sensor. Two guide elements 28 are rotated from a rest position 29 to a working position 30 and guide the transfer of the bale. A bale transfer device 26 has lateral frames and can be pivoted around a horizontal axis. A bale 7 is transferred onto the transfer device being in a horizontal position A1. The transfer device 26 is rotated into a vertical position. The bale 7 rolls onto the table of the wrapping device.

In US 2012204739 A1 a bale is carried on a carrier 26. To eject the bale out of the pressing chamber this carrier 26 is rotated such that the bale is lifted and dropped out of the chamber. Afterwards the carrier 26 is rotated backwards to take material which is pressed to a further bale.

In EP 2243349 A2 and U.S. Pat. No. 8,281,713 B2 a baler with a baling chamber 26 and a frame 12 is described. This baling chamber 26 is defined by a driven roller 28 at the bottom, two driven rollers 36, 38 mounted at the frame 12 and four driven rollers 46, 48, 50, 52 and three idler rollers 54, 78, 90 which all are mounted on a pivotal arc-shaped holder 44. In the rear part the baling chamber is defined by a flexible endless belt 76 runs which runs around the driven roller 74 and idler rollers ("rotating bodies") 54, 78, 90, 80, 82, 84, 86, 88. The four driven rollers 46, 48, 50, 52 at the holder 44 and the endless belt 76 rotate and press material in the chamber 26. The idler roller 90 mounted at the holder is connected with the further idler roller 88. The connection is implemented by means of an arm 112 carrying the roller 88 and arms 100, 114 and a lever arm 110. The growing bale pivots the holder 44 away from the belt 76.

In EP 1264531 B1 a baler with a baling chamber whose two side walls are one-parted is described. The bale is created by means of flexible endless belts. An arm 56 is pivotal around an axis parallel to the rotation axis of the growing bale and carries two rollers 64. A further arm 58 carries two further rollers 62, cf. FIG. 1. The rollers 64 carry the growing bale from below. To eject the bale out of the chamber, the arm 56 with the rollers 64 is pivoted around approx. 150 degrees. The bale is no longer supported and drops out of the chamber.

In US 20120137630 A1 a baler-wrapper combination is described. A baler creates a round bale in a bale forming chamber 15. A bale transfer unit transfers the bale to a bale wrapping means, cf. FIG. 3 and FIG. 4. A moveable portion of the combination belongs to the baler as well as to the bale transfer unit. In the embodiment the bale forming chamber 15 is formed by a stationary arcuate segment 18, a lower arcuate segment 19 and a moveable upper arcuate segment 20. The lower arcuate segment 19 can be rotated around the rotational axis 35. The upper arcuate segment 20 can be rotated around the rotational axis 39. This moveable portion 19, 20 can be pivoted between a bale forming position and a transfer position. In the bale forming position the moveable portion 19, 20 belong to the bale forming chamber 15 and contribute to forming a bale. When being transferred into the transfer position the moveable portion 19, 20 is transferred into the bale forming chamber 15 and hereby into a "generally upwardly outwardly direction". By being transferred into the transfer position the moveable portion 19, 20 urges a bale out of the bale forming chamber and onto the bale wrapping means. FIG. 1 shows the combination in a mode for ejecting a bale. Both parts 19, 20 are rotated around their respective rotational axes 35, 39. FIG. 8a shows schematically the combination in the bale forming position, FIG. 8d in the bale ejecting position. FIG. 8b and FIG. 8c show intermediate positions.

FIG. 1 of EP 1205102 A2 shows a combined baler and bale wrapper apparatus 10. An upper group of rollers 12 and a lower group of rollers 13 together form a bale forming chamber 14, cf. FIG. 3. A roller carrier 15 has the form of a hood which can be pivoted between a bale-forming position, cf. FIG. 1, and an inoperative position, cf. FIG. 3. The bale 18 can be ejected out of the bale forming chamber 14 if the apparatus 10 is in the position of FIG. 3, cf. [0048]. To facilitate the release of the bale 18 the roller 12a can be moved radially outwardly while the hood 15 moves upwardly. By this the space between the roller 12a and the oppositely facing roller of the upper group 12 is enlarges to allow the bale to be released.

FIG. 1 of WO 03/039240 A1 shows a combined baling and bale wrapping machine. A bale forming chamber 10 consists of an upper part 11 and a lower part 12. The lower part 12 is fixed to a chassis 1. The upper part 11 comprises an array of rollers 15. The rollers of the upper part 11 surround a bale in the chamber with more than 180 degrees, cf. FIG. 2. The lower part 12 comprises an array of rollers 16. A rear flap or door comprises four rollers 15 and can be pivoted around a bearing 56. The upper part 11 is mounted at a cantilever support beam 8 and can be lifted upwards, cf. FIG. 2. After the creation of the bale 20 is finished, the upper part 11 is lifted upwards and two wrapping arms 23 guide two film dispensers 21 around the bale on the lower part 12. The wrapped bale 20 is tipped from the baler, cf. FIG. 3. For supporting the step of dropping the bale, the door 55 is opened by pivoting it around the bearing 56, cf. the full lines in FIG. 2. A frame 26 with four rollers 16 pivots downwardly about a pivot 27, cf. FIG. 3. An endless chain 28 is guided around these rollers 26. The bale 20 tips to the ground.

FIG. 1 of U.S. Pat. No. 6,463,714 B2 shows a baler 10 with a lower housing section 22, an upper housing section 24, a lower pair of guide arms 26, an upper pair of guide arms 28, and a positioning arrangement 30. Rolls 40 are mounted at the lower housing section 22 and are arranged in curved checks 42. Further rolls 40 are mounted at the upper housing section 24. A bale 44 is created in the baling chamber formed by the two housing sections 22, 24 and is wrapped with a net or foil 80, cf. FIG. 1 and FIG. 2. After having crated and wrapped the bale 80, the upper housing section 24 is lifted upwards by means of the upper guide arms 28 and the positioning arrangement 30. Four rolls 40 of the lower housing section 22 are mounted on one check portion and can be pivoted downwardly, cf. FIG. 1 and FIG. 2. These four rolls are pivoted and the bale 44 tips out of the baling chamber.

Problem

It is an object of the invention to provide a bale forming apparatus which creates a round bale from loose material in a baling chamber arrangement when being operated in a bale forming mode and which afterwards ejects this bale out of the baling chamber arrangement through a bale ejecting aperture when being operated in a bale ejecting mode wherein the risk that the bale cannot be ejected through the bale ejecting aperture is to be reduced without the need of increasing the pivoting angle of a movable chamber part and wherein neither a pusher element nor a pulling element is required for ejecting the completed bale even if the bale forming apparatus operates in a downhill orientation and wherein the risk is to be reduced that the force of gravity urges the bale to remain in the chamber arrangement. It is a further object to provide a bale forming method for achieving these goals.

Solution

The bale forming apparatus compliant with the invention forms a round bale in a baling chamber arrangement having a fixed chamber part and a movable chamber part. The movable chamber part is pivotally mounted and can be pivoted with respect to the fixed chamber part. The chamber arrangement has two side walls and a circumferential wall. The circumferential wall extends from one side wall to the other side wall. Several conveying units are mounted at the chamber arrangement. These conveying units contribute to forming the bale.

The bale forming apparatus can be operated in a bale forming mode in which the two chamber parts are joined by being linked together. In the bale forming mode the baling chamber arrangement with the conveying units surrounds a bale forming chamber. A round bale is formed from this loose material in this bale forming chamber, i.e. in the interior of the baling chamber arrangement. When operated in the bale forming mode, the conveying units convey injected loose material in the baling chamber arrangement along the circumferential wall such that the loose material in the bale forming chamber is formed and pressed into a bale.

The bale forming apparatus can be transferred into a bale ejecting mode. During this transfer the movable chamber part is pivoted away from the fixed chamber part such that an ejecting aperture between the two chamber parts is formed. A completed bale is ejected out of the baling chamber arrangement through this ejecting aperture.

The method being in accordance with the invention uses such a bale forming apparatus for creating a bale from loose material and for ejecting such a bale out of the baling chamber arrangement.

The invention refers in particular to the arrangement of one conveying unit which is mounted at one chamber part and is arranged adjacent to the other chamber part. This adjacent conveying unit is therefore either mounted at the movable chamber part and is adjacent to the fixed chamber part or is mounted at the fixed chamber part and adjacent to the movable chamber part. The adjacent conveying unit extends from one side wall to the other side wall.

The other chamber part—that chamber part which does not carry the adjacent conveying unit—comprises an edge and a receiving aperture adjacent to this edge. This edge and therefore also the receiving aperture extends from side wall to side wall. The edge and therefore also the receiving aperture are arranged adjacent to the chamber part with the pivotally mounted conveying unit when the bale forming apparatus is operated in the bale forming mode.

When the bale forming apparatus is operated in the bale forming mode, this adjacent conveying unit mounted at the one chamber part operates as follows:

The adjacent conveying unit contributes to forming a bale in the bale forming chamber and in particular contributes to conveying loose material along the circumferential wall.

The adjacent conveying unit engages fully or at least partially into the receiving aperture in the other chamber part. By this engagement the adjacent conveying unit closes at least partially the receiving aperture such that no large gap or no gap at all between the two chamber parts occurs.

The bale forming apparatus is further arranged as follows: When the bale forming apparatus is transferred into the bale ejecting mode, the adjacent conveying unit is shifted or pivoted out of the receiving aperture. By this movement the receiving aperture is released and becomes a part of the bale ejecting aperture.

The adjacent conveying unit is mounted such that it forms one border of the bale ejecting aperture when the bale forming apparatus is transferred into the bale ejecting mode. One edge of the receiving aperture in the other chamber part forms a further border of the ejecting aperture. Pivoting the adjacent conveying unit out of the receiving aperture increases the distance to the other chamber part and therefore increases the bale ejecting aperture. Pivoting or shifting away the adjacent conveying unit moves this conveying unit out of the receiving aperture and thereby further releases the receiving aperture.

The method according to the invention comprises the following steps:

The bale forming apparatus is first operated in the bale forming mode. A bale is formed in the bale forming chamber. The adjacent conveying unit engages into the receiving aperture and contributes to forming the bale.

Afterwards the bale forming apparatus is transferred into the bale ejecting mode. The adjacent conveying unit is pivoted or shifted out of the receiving aperture. The receiving aperture becomes a part of the ejecting aperture. The bale is ejected out of the bale forming chamber through this ejecting aperture.

Advantages

The invention provides a bale forming apparatus with a two-parted baling chamber arrangement. One chamber part can be pivoted with respect to the other chamber part. This feature enables to use nearly the entire baling chamber arrangement for creating a bale. This bale can be ejected after the movable chamber part away has been pivoted from the fixed chamber part. This pivotal movement opens the bale chamber and providing a bale ejecting aperture. A one-parted bale chamber with an aperture for ejecting the bale restricts the size of the bale to the size of this ejecting aperture. If the aperture is small, only small bales can be created. A large aperture in a one-parted chamber can restrict the pressure which the baling chamber can exert to the material and can lead to reduced stiffness and stability of the bale forming apparatus.

In the bale forming mode the adjacent conveying unit engages into the receiving aperture and contributes to forming the bale. The adjacent conveying unit urges a pressure onto loose material in the baling chamber arrangement as the adjacent conveying unit extends from one side wall to the other side wall and as the adjacent conveying unit is mounted at the chamber arrangement.

In contrast, the receiving aperture in the other wall part becomes a part of the ejecting aperture when the bale forming apparatus has been transferred into the bale ejecting mode and the adjacent conveying unit is pivoted or shifted out of the receiving aperture. When the bale forming apparatus is transferred into the bale ejecting mode, the receiving aperture becomes a part of the ejecting aperture. Therefore the step of pivoting the adjacent conveying unit into the bale releasing position increases the ejecting aperture. This increase is achieved without shifting or tilting or pivoting one entire chamber part.

The following advantage occurs if the bale forming apparatus according to the invention is a part of a vehicle. This vehicle is moved over ground in a travelling direction. Seen in this travelling direction the moveable chamber part is arranged behind the fixed chamber part.

A large ejecting aperture decreases the risk that the bale forming apparatus being part of a vehicle cannot eject a bale out of the pressing chamber. This risk occurs in particular if the bale forming apparatus being part of a vehicle is operated in a hilly environment and has to eject a bale in an uphill direction. In this case the force of gravity tries to urge the completed and wrapped bale back into the bale forming chamber if the ejecting aperture is too small. This risk further occurs if a small bale has to be ejected out of the bale forming chamber where the bale's center of gravity is near the fixed chamber part, i.e. far away from the ejecting aperture.

According to the invention the adjacent conveying unit engages into the receiving aperture in the other chamber part. In particular this feature distinguishes a baler according to the invention from a baler with a conveying unit being positioned near a border of the other chamber part extends in one plane and not comprising a receiving aperture. Nevertheless the segment of the circumferential surface of the bale forming chamber surrounded by the moveable chamber part is large enough. This feature allows reducing the size of the moveable chamber part in comparison with an arrangement without such an aperture. A smaller moveable chamber part can be pivoted with less torque and/or quicker.

The invention provides a mechanism which surrounds a large part of the circumferential wall with conveying units when the bale forming apparatus is in the bale forming mode. These conveying units are mounted at the chamber arrangement and convey loose material around the baling chamber arrangement. Simultaneously further loose material can be inserted into the bale forming chamber. These two procedures enable to press the loose material to a growing bale. The adjacent conveying unit belongs to the plurality conveying units and contributes to pressing the loose material and to forming the bale in the bale forming chamber when the adjacent conveying unit engages into the receiving aperture.

The receiving aperture becomes a part of the ejecting aperture if the bale forming apparatus is operated in the bale ejecting mode. It is possible that the side walls of the baling chamber arrangement guide the bale during ejection while the bale is ejected through the enlarged ejection aperture including the receiving aperture.

The invention can be used with a pusher unit or with a further unit which actively ejects the bale out of the bale forming chamber. But thanks to the enlarged ejecting aperture no such active ejecting unit is required.

EMBODIMENTS

In a preferred embodiment the adjacent conveying unit is located in a lower area of the baling chamber arrangement. The receiving aperture and the adjacent conveying unit engaging into the receiving aperture are below a bale in the bale forming chamber. The adjacent conveying unit supports the bale from below if the bale forming apparatus is operated in the bale forming mode. Transferring the bale forming apparatus in the bale ejecting mode pivots or shifts the adjacent conveying unit out of the receiving aperture and increases the ejecting aperture. The force of gravity urges the bale through the increased ejecting aperture out of the bale forming chamber. The risk is further decreased that the bale remains in the bale forming chamber.

In a preferred embodiment the adjacent conveying unit is mounted at the movable chamber part. The receiving aperture is in the fixed chamber part. Moving the movable chamber part together with the adjacent conveying unit away from the fixed chamber part pivots the adjacent conveying unit out of the receiving aperture.

In one implementation the bale forming apparatus is a part of a vehicle moved over ground in a travelling direction. Seen in the travelling direction the moveable chamber part is arranged behind the fixed chamber part.

Preferably the movable chamber part is rotated or otherwise pivoted around a horizontal rotating axis when the bale forming apparatus is transferred into the bale ejecting mode. The ejecting aperture occurs below this horizontal rotating axis. If the bale forming apparatus is a part of a vehicle which can be moved in a travelling direction, this rotating axis is preferably perpendicular to the travelling direction. The embodiment with rotating the movable chamber part around the horizontal axis saves a lifting mechanism for lifting the entire movable chamber part upwards. Lifting the movable chamber part requires more force and more energy than just a rotating the movable chamber part.

In one embodiment the adjacent conveying unit is mounted at the one chamber part such that the conveying unit can only rotate around its own symmetrical axis but cannot be pivoted all shifted laterally, i.e. perpendicular to its rotating axis.

In a preferred embodiment, however, the adjacent conveying unit is pivotally mounted at the one chamber part. In one implementation the adjacent conveying unit is rotatably mounted at a lever arrangement and this lever arrangement is pivotally mounted at the one chamber part. The pivotally mounted adjacent conveying unit can therefore be brought into a bale forming position and into a bale releasing position. In the bale forming position the adjacent conveying unit engages into the receiving aperture. Pivoting the adjacent conveying unit into the bale ejecting position further increases the ejecting aperture.

According to the embodiment with the pivotally mounted adjacent conveying unit at least one conveying unit, preferably the adjacent conveying unit, is pivotally mounted at one chamber part, i.e. either at the movable chamber part or at the fixed chamber part. This pivotally mounted conveying unit can be brought into a bale forming position and can be pivoted into a bale releasing position. The pivotally mounted adjacent conveying unit in the bale forming position contributes to conveying material in the baling chamber arrangement along the circumferential wall. When being in the bale forming position, the pivotally mounted adjacent conveying unit engages at least partially into the receiving aperture adjacent to the edge of the other chamber part such that no large gap between the two chamber parts occurs and the pivotally mounted adjacent conveying unit closes the receiving aperture. Transferring the pivotally mounted conveying unit into the bale releasing mode by pivoting or shifting it further increases the distance between the pivotally mounted conveying unit and the other chamber part. The step of transferring the pivotally mounted conveying unit back in the bale forming position decreases this distance.

The embodiment with the pivotally mounted adjacent conveying unit further increases the ejecting aperture without the need of increasing the angle or the distance over which the movable chamber part is pivoted with respect to the fixed chamber part. This reduces the torque consumption needed for transferring the bale forming apparatus into the bale ejecting mode. Therefore this embodiment further decreases the risk that the bale forming apparatus cannot eject the bale out of the baling chamber arrangement. The bale forming apparatus can therefore securely be operated with an even higher inclination on the ground.

The embodiment with the receiving aperture arranged vertically or angularly below the bale can be combined with the embodiment that the adjacent conveying unit is pivotally mounted. The force of gravity of the bale pivots the pivotally mounted adjacent conveying unit out of the receiving aperture. This effect further enlarges the ejecting aperture without the need of an active drive for pivoting the adjacent conveying unit.

The force of gravity urging onto the adjacent conveying unit can be combined with an actuator pivoting the adjacent conveying unit. The actuator can also operate without being supported by the force of gravity. One implementation of such an actuator is described in the following.

According to the invention the bale forming apparatus can be operated in the bale forming mode and can be transferred into the bale ejecting mode. In a preferred embodiment of the adjacent conveying unit being pivotally mounted the step of transferring the bale forming apparatus into the bale ejecting mode triggers the step that the pivotally mounted adjacent conveying unit is pivoted away from the other chamber part and into the bale releasing position. Preferably the step of pivoting away the pivotally mounted conveying unit is triggered by a mechanical connection between the movable chamber part and the pivotally mounted conveying unit. This embodiment saves an additional synchronization unit. Accordingly the step of transferring back the bale forming apparatus into the bale forming mode triggers the step that the pivotally mounted conveying unit is pivoted back into the bale forming position and engages the receiving aperture.

Preferably the movable chamber part is pivotally mounted at the fixed chamber part. The fixed chamber part is rigidly connected with the chassis or with the frame of the bale forming apparatus. At this chassis or frame several wheels can be mounted such that the bale forming apparatus is part of a vehicle. The movable chamber part is not directly connected with the chassis or frame.

Different embodiments are possible by what means the pivotally mounted conveying unit is pivoted away from the other chamber part and into the bale releasing position.

One embodiment is an active drive, e.g. a hydraulic or electric motor. An alternative embodiment comprises a passive tensioning element which exerts a tension. This tension is oriented in a direction to pivot the pivotally mounted adjacent conveying unit into the bale releasing position. The tensioning element may comprise at least one spring or a closed hydraulic or pneumatic cylinder. The bale forming apparatus has a holding unit. When being operated in the bale forming mode, this holding unit holds the pivotally mounted conveying unit against the force of this tensioning element in the bale forming position.

Transferring the bale forming apparatus into the bale ejecting mode releases the pivotally mounted conveying unit from this holding unit. The tension unit now pivots the adjacent conveying unit. This embodiment does not require a drive for pivoting the pivotally mounted conveying unit and saves monitoring and synchronizing this device.

The holding unit is preferably mounted at the other chamber part and can be implemented as a purely passive element. Preferably a guiding element guides the pivotally mounted conveying unit into the bale forming position when the bale forming apparatus is transferred into the bale forming mode. This ensures a proper position of the pivotally mounted conveying unit in the plurality of conveying units while a bale is formed in the chamber. The holding unit can be used in combination with a pivotally mounted adjacent conveying unit and in combination with an adjacent conveying unit which cannot be pivoted with respect to the one chamber part. The holding unit holds the adjacent conveying unit in the receiving aperture as long as the bale forming apparatus is operated in the bale forming mode.

Preferably the pivotally mounted adjacent conveying unit is moved away from the other chamber part by pivoting the pivotally mounted conveying unit around a rotation axis which is perpendicular to the conveying direction yielded by the pivotally mounted conveying unit. Pivoting or shifting the pivotally mounted conveying unit can also comprehends a linear movement away from and towards the other wall part. The pivoting step can comprehend a rotational and a linear movement.

In one embodiment the bale forming apparatus comprises several conveying units. These conveying units contribute to forming the bale. Some conveying units are mounted at the movable chamber parts and the others at the fixed chamber part. Exactly one conveying unit is pivotally mounted. The other conveying units cannot be shifted or pivoted laterally.

In one embodiment a wrap for the bale is injected into the bale forming chamber and then into the space between the bale and the circumferential chamber wall. The conveying units including the adjacent conveying unit rotate the bale. The rotating bale pulls the wrap into this space. In this embodiment the adjacent conveying unit also contributes to wrapping the bale. The wrap can be a net or a plastic foil, e.g.

Preferably the bale forming apparatus has a conveying arrangement mounted at the one chamber part. This conveying arrangement comprises:
the adjacent conveying unit engaging in to the receiving aperture,
at least one further conveying unit which also belongs to the plurality of conveying units,
a holding arrangement for these two conveying units, and optionally a local transmission unit.

This conveying arrangement is mounted at the one chamber part. Preferably the conveying arrangement is pivotally mounted and can be pivoted into a bale forming position. When the conveying arrangement is in the bale forming position, the pivotally mounted conveying unit is in the bale forming position and engage into the receiving aperture and both conveying units contribute to forming a bale. The conveying arrangement can be pivoted into a bale releasing position. It is however also possible that the conveying arrangement is rigidly mounted at the chamber part.

The embodiment with the conveying arrangement enables an easy way of driving the adjacent conveying unit. This embodiment is in particular advantageous if the adjacent conveying unit is mounted at one chamber part and a motor or a drive shaft is connected with the other part, i.e. connected with that chamber part in which the receiving aperture is inserted.

A torque is transferred from the one chamber part to the conveying arrangement. The local transmission unit being part of the conveying arrangement transfers this torque to the adjacent conveying unit. This embodiment solves the problem of driving the adjacent conveying unit engaging into the receiving aperture. No torque needs to be transmitted from the other chamber part to the adjacent conveying unit even if the adjacent conveying unit is temporarily engaging into the receiving aperture inserted into the other chamber part. This embodiment does not require a transmission means which is necessarily interrupted in the bale ejecting mode and must therefore be re-established again when the bale forming apparatus is transferred back into the bale forming mode. In particular no sprocket wheels or drive chains are required for transmitting torque from one chamber part to the other chamber part.

Preferably the conveying arrangement can be rotated around a rotation axis. A rotation around this rotation axis transfers the conveying arrangement from the bale forming position into the bale releasing position and vice versa. The pivotally mounted conveying unit is arranged in the conveying arrangement such that a distance between the pivotally mounted conveying unit and the rotation axis occurs. It is also possible to shift the conveying arrangement away from the other chamber part during the pivoting step. The pivoting step can comprehend a rotational as well as a linear movement.

According to the embodiment just mentioned, the conveying arrangement comprises a further conveying unit and can be rotated or otherwise pivoted around the rotational axis with respect to that chamber part at which the conveying arrangement is mounted. Preferably the further conveying unit comprises a roller or another rotating element which can be rotated around a rotating axis. The rotating axis of the conveying arrangement equals the rotating axis of this further conveying unit. This embodiment only requires a small torque for pivoting the conveying arrangement from the bale forming position into the bale ejecting position as no lever between the rotating axis of the conveying arrangement and the further conveying unit occurs.

The adjacent conveying unit can be implemented such that it comprehends a roller or an endless chain or an endless conveying belt or an apron conveyor. It is also possible to combine different kinds of conveying units.

In one embodiment, all conveying units have the same geometrical shape.

In one embodiment the bale forming chamber has a fixed size. The conveying units are directly mounted at the baling chamber arrangement and are not moved laterally during operation.

In one embodiment all conveying units are directly mounted at the baling chamber arrangement. Every conveying unit can only rotate around its own rotational axis but cannot be shifted or pivoted laterally. In a further embodiment at least one conveying unit is mounted on a holding member. The holding member with this conveying unit can be pivoted laterally for enlarging or reducing the volume of the chamber arrangement. This embodiment can be combined with an implementation in which every conveying unit comprises a pressing roller.

In an alternative embodiment the baling chamber arrangement is variable such that the bale forming chamber is increased by the growing bale. Some conveying units comprise endless pressing belts which exert a pressure onto the bale and are pressed away by the growing bale. The adjacent conveying unit preferably comprises a pressing or guiding roller and can be pivotally mounted whereas the conveying units urging the pressing belts against the bale are fixed and not pivotally mounted.

Preferably the circumferential wall is divided into two parts according to the two chamber parts. The movable chamber part comprehends a movable wall part and the fixed chamber part comprehends a fixed wall part. The adjacent conveying unit is mounted at one chamber part with one wall part. The other chamber part comprehends the other wall part. If the adjacent conveying unit is mounted at the movable chamber part, the other wall part is the fixed wall part.

In one embodiment the other wall part has a wall aperture. This wall aperture forms the receiving aperture or is part of the receiving aperture and extends between two side walls of the other chamber part. The adjacent conveying unit in the bale forming position engages at least partially into this wall aperture when the bale forming apparatus is operated in the bale forming mode. When the bale forming apparatus is transferred into the bale ejecting mode and the adjacent conveying unit is pivoted or shifted out of the wall aperture, this wall aperture is part of the entire ejecting aperture. This embodiment leads to a large ejecting aperture without decreasing the bale forming function of the bale forming apparatus. When the bale forming apparatus is transferred into the bale ejecting mode, the wall aperture becomes a part of the ejecting aperture. The ejecting aperture comprising the wall aperture extends entirely or at least partially between the two side walls of the other chamber part. These two side walls guide the bale during the step of dropping or otherwise ejecting the bale through the ejecting aperture out of the chamber arrangement. This guiding function is in particular important if the bale forming apparatus is moved over ground and tilts or incline. This embodiment makes it easier to guide the ejected bale in a desired direction.

In one embodiment the adjacent conveying unit is mounted at the movable chamber part. The fixed chamber part is the other chamber part. It is also possible that the adjacent conveying unit is mounted at the fixed chamber part.

In one embodiment the border area between the fixed chamber part and the movable chamber part has the shape of a plane or comprehend in its lower part a plane. The receiving aperture extends perpendicular or angularly from this plane. This plane is in this embodiment not vertically oriented but sloping with respect to a vertical orientation even if the bale forming apparatus is operated on a horizontal ground. The receiving aperture is adjacent to this plane between the two chamber parts. This embodiment enables to implement a further device under the fixed chamber part, e.g. a drive or a part of a bale transfer unit which transfers a bale from the chamber onto a supporting part of a further processing unit, e.g. a bale wrapping device. Thanks to the invention it is possible to drop the bale even if this embodiment of the border is implemented.

In one embodiment the formed bale extends from side wall to side wall. In a further embodiment a plate is arranged between a side wall and a bale in the chamber arrangement. This plate can rotate and can reduce the friction caused by the rotating bale.

In one embodiment the moveable chamber part comprises two side wall parts. At least one side wall part is divided into two areas, namely an upper area and a lower area. The distance between the upper area and the other side wall is smaller than the distance between the lower area and the other side wall. This embodiment helps to eject a completed bale out of the bale forming chamber. The upper area and the other side wall temporarily clamp the bale between them while the moveable chamber part is pivoted into the bale ejecting mode.

The invention can be used in a vehicle which is used for creating a round bale from loose agricultural material, i.e. hay, straw, silage. In this application the bale forming apparatus is preferably propelled in a travelling direction and picks up material from the ground. It is also possible to use the invention in a stationary plant for recycling purposes where the material are garbage components, i.e. shredded paper or cartridge or plastic elements. In this application the bale forming apparatus may be installed as a stationary plant.

These and other aspects of the invention and of the preferred embodiments will be even more apparent from the detailed embodiment as described below and will be elucidated in detail there.

DESCRIPTION OF EMBODIMENT

In the following the invention is described by means of a preferred embodiment using the following figures.

Figure 3:
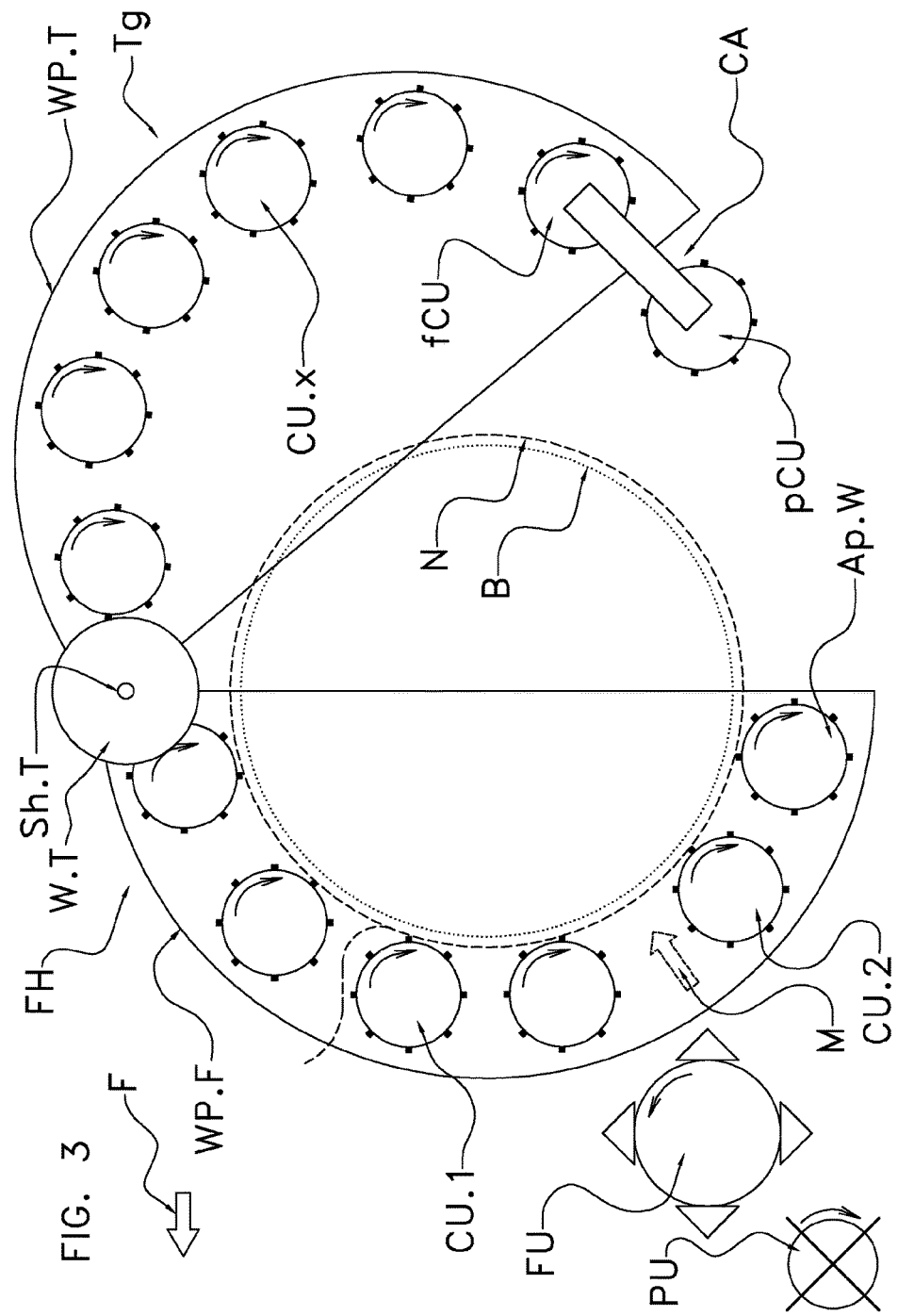
Figure 4:
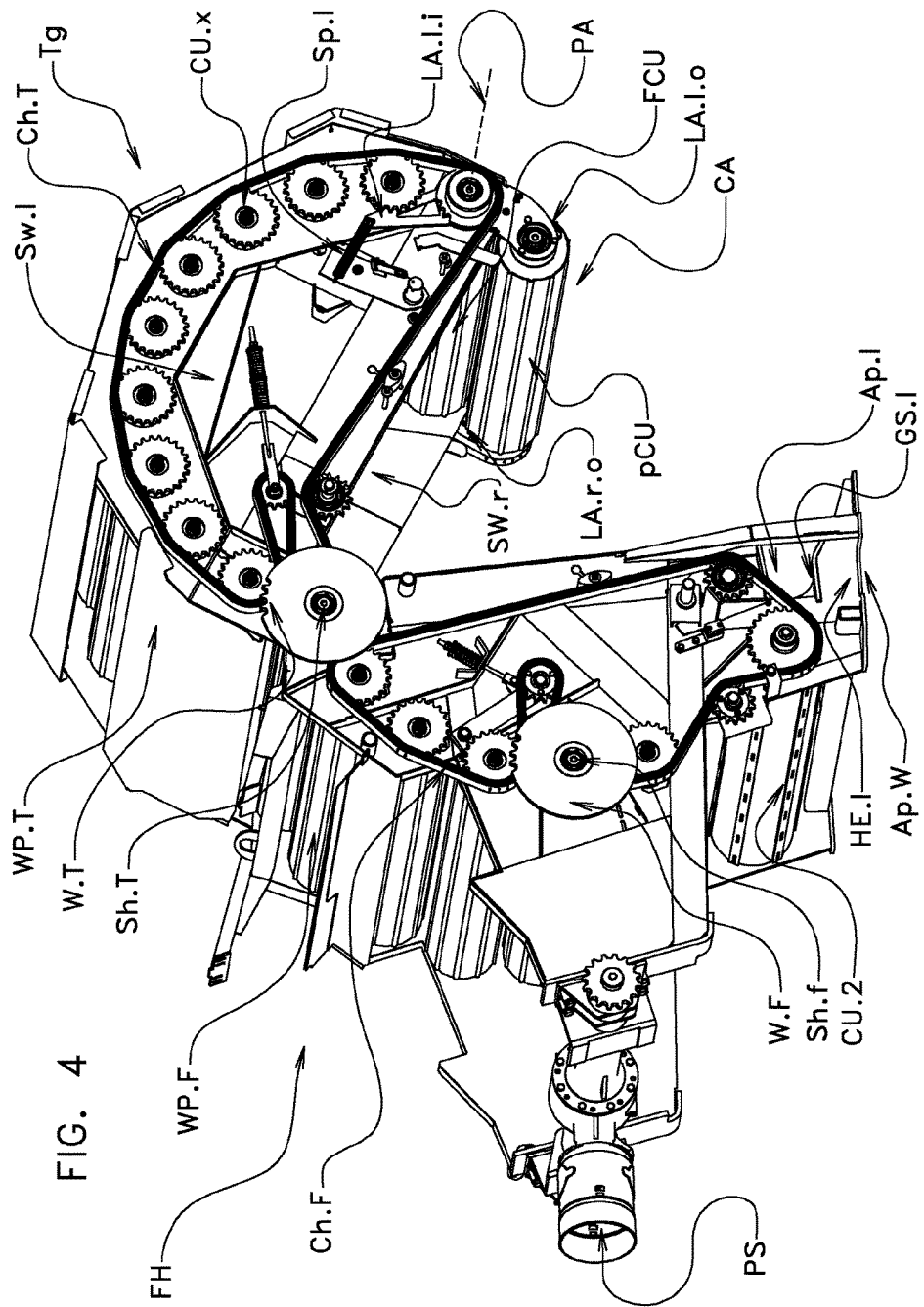
Figure 5:
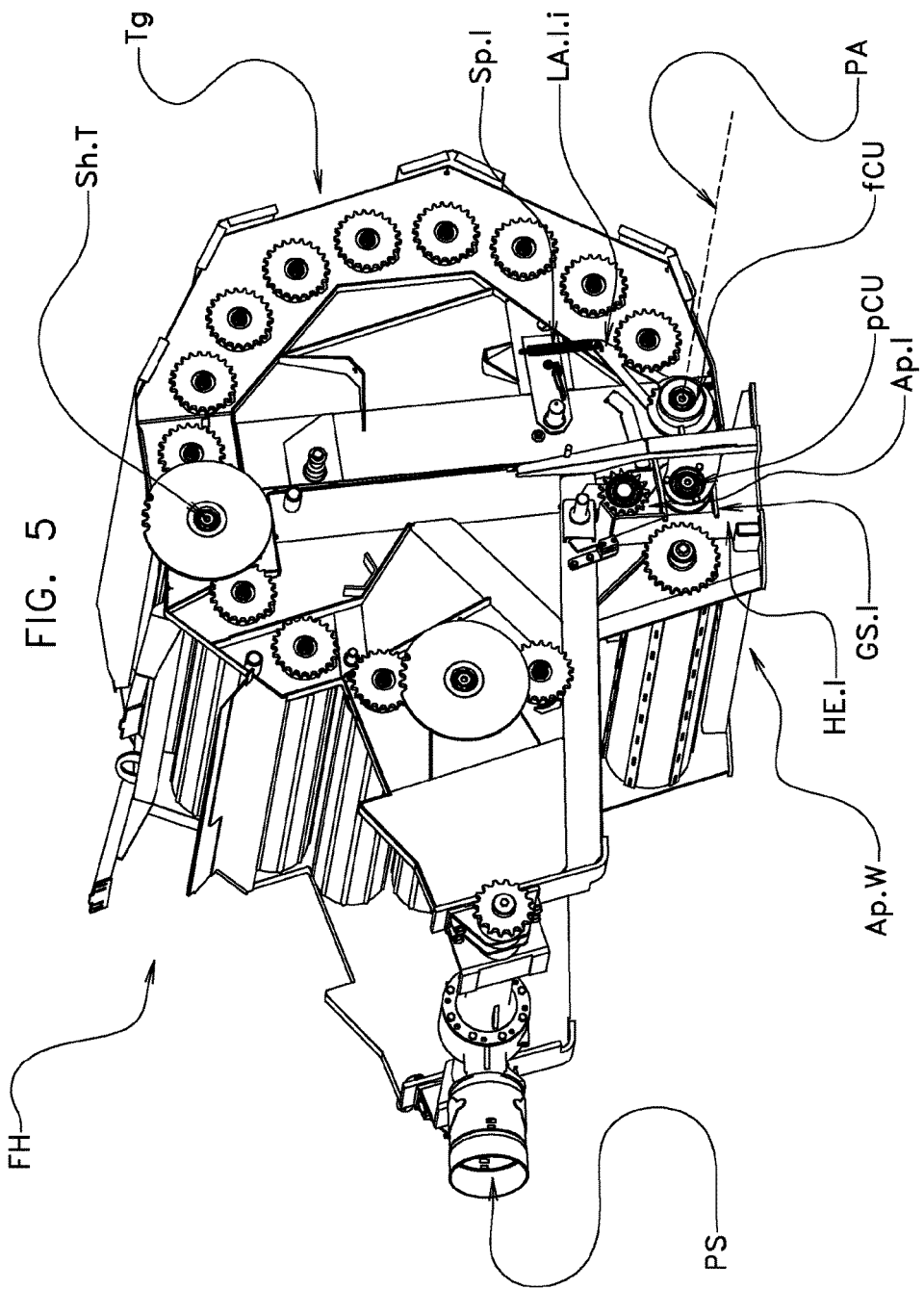
Figure 6:
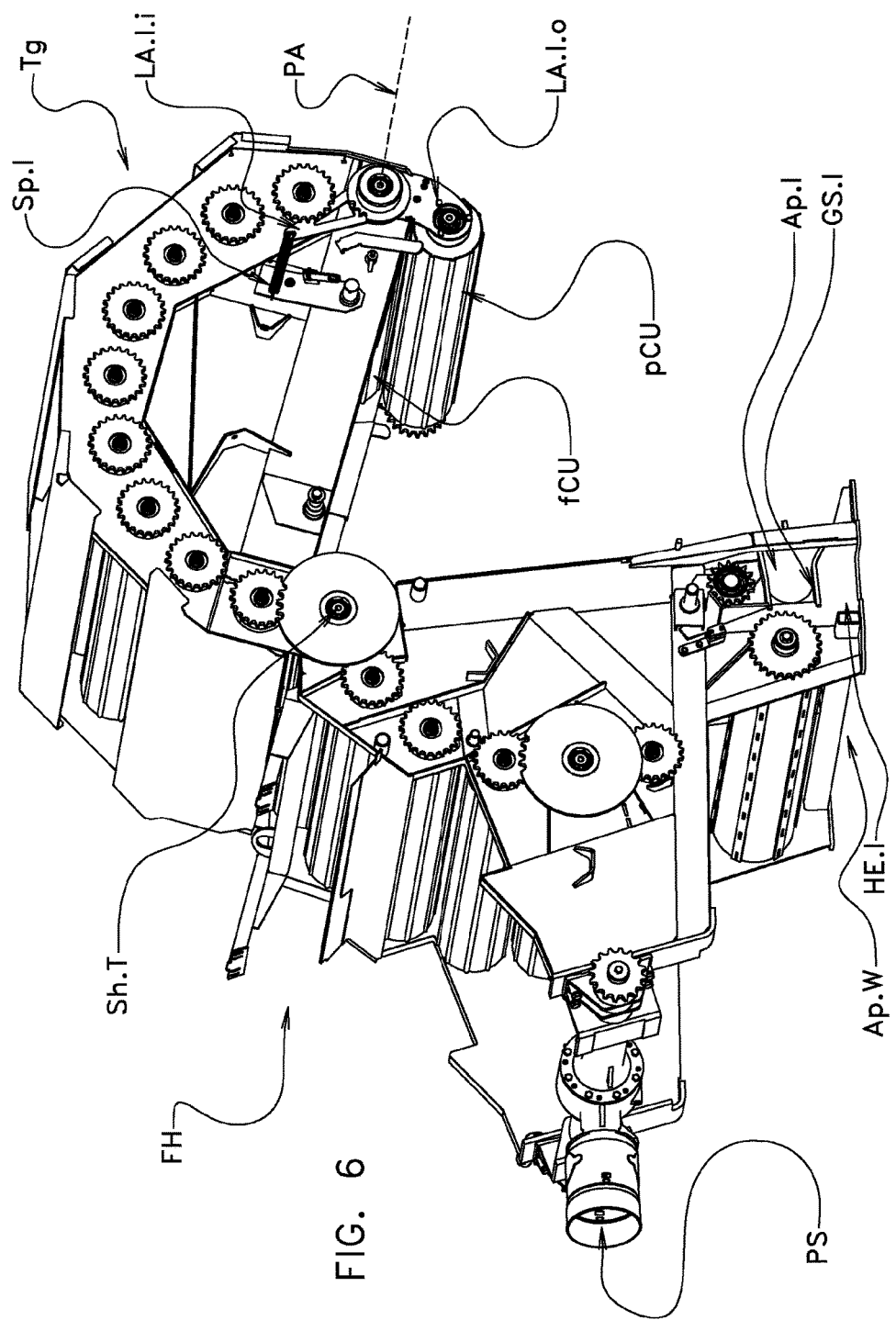
Figure 7:
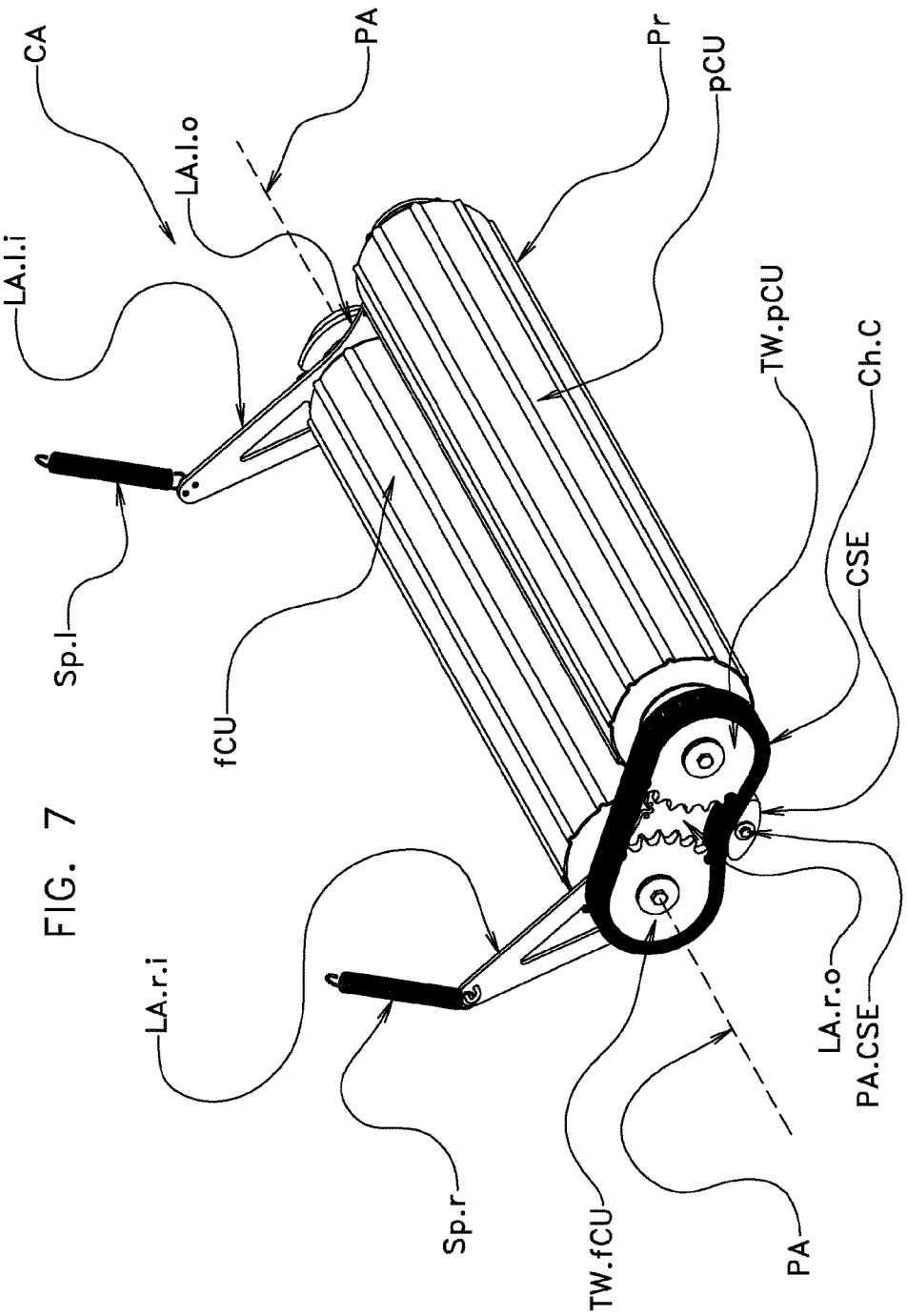

FIG. 3 schematically a baler with the invention in a bale ejecting mode;

FIG. 4 shows the chamber arrangement according to the preferred embodiment where the movable tailgate is in an intermediate position;

FIG. 5 shows the chamber arrangement of FIG. 4 with the tailgate and the pivotally mounted adjacent conveying unit in the bale forming position;

FIG. 6 shows the chamber arrangement of FIG. 4 in the bale releasing position;

FIG. 7 shows the conveying arrangement with the pivotally mounted conveying unit more detailed;

FIG. 8 shows the chamber arrangement from below in the bale forming position.

In the preferred embodiment the invention is used in a vehicle for agricultural purposes. A round-cylindrical bale has to be formed from agricultural crop material, e.g. from hay, straw, silage. The formed bale has two circular front faces and a circumferential surface between the front faces.

Figure 1:
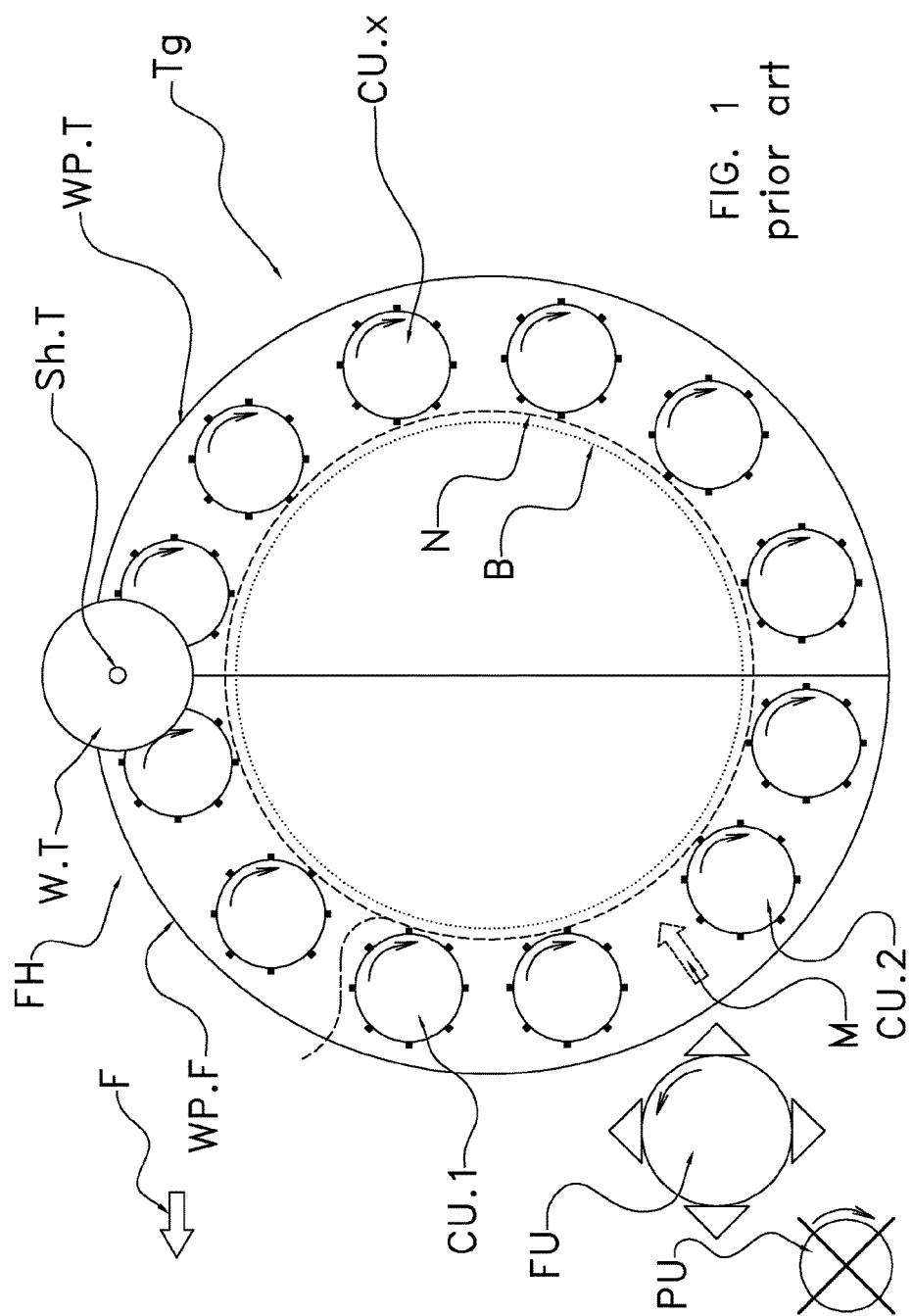
FIG. 1 shows schematically a bale forming apparatus according to the prior art in a bale forming mode.
Figure 2:
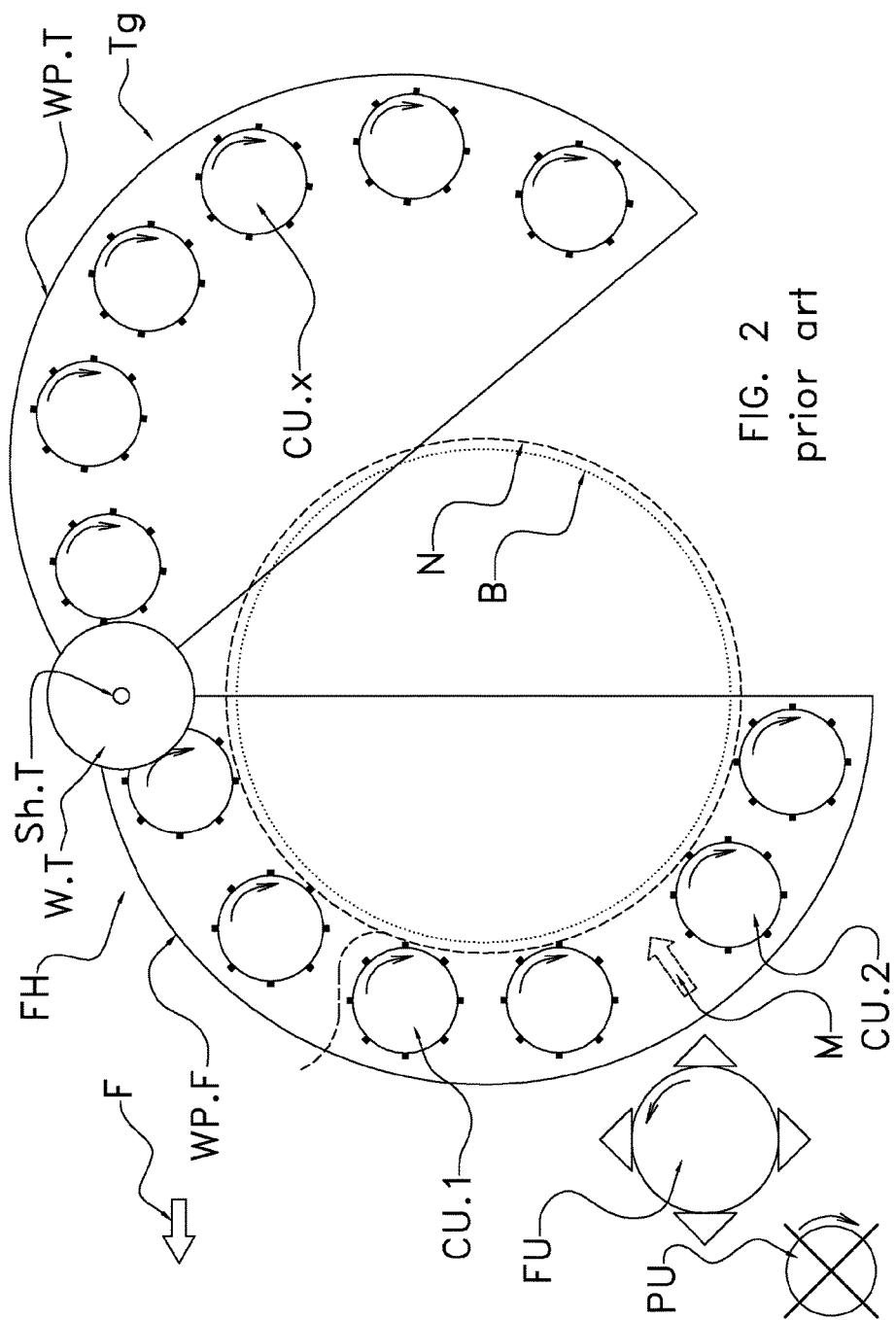
FIG. 2 shows the bale forming apparatus of FIG. 1 in a bale ejecting mode.

FIG. 1 and FIG. 2 show a bale forming apparatus according to the prior art. This bale forming apparatus comprises:
- a pick-up unit PU with rotating tines for picking up crop material from the ground,
- a cutting and feeding unit FU with a cutting apparatus with knives and with a rotor having rotating conveying stars with rigid tines,
- a front housing FH mounted on a chassis with wheels (not shown),
- a tailgate Tg which is pivotally mounted at the front housing FH by means of a shaft Sh.T at which a left teethed wheel WT and in one implementation a right wheel (not shown) are mounted,
- a drive for pivoting the tailgate Tg around the shaft Sh.T (not shown),
- a wrapping material supplying unit (not shown) which supplies a net which is afterwards wrapped around a bale in the chamber.

The fixed front housing FH and the movable tailgate Tg together form an approximately cylindrical chamber arrangement with a circumferential wall and two side walls parallel to the drawing planes of FIG. 1 and FIG. 2 (not shown). The circumferential wall extends from sidewall to sidewall. The circumferential wall is separated into a fixed wall part WP.F belonging to the front housing FH and a movable wall part WP.T belonging to the tailgate Tg. Every side wall also has a front side wall part (belonging to FH) and a rear side wall part (belonging to Tg). The chamber arrangement surrounds a bale forming chamber.

The bale forming apparatus is driven in the travelling direction F by a tractor or combine harvester or field chopper, e.g. Loose crop material is picked up from the ground and is inserted into the bale forming chamber in a feeding direction being opposite to the travelling direction F.

Several conveying units comprehending driven rollers with protrusions (longitudinal ribs) are mounted at the chamber arrangement. In FIG. 1 and FIG. 2 the conveying unit CU.1, CU.2 and CU.x are shown. All rollers of the conveying units rotate in the same direction (in FIG. 1 and FIG. 2 clockwise around a fixed rotational axis).

FIG. 1 shows the bale forming apparatus in the bale forming mode. The apparatus has just finished creating a round bale B and is just wrapping this bale B with a net made of twine or other wrapping material. The tailgate Tg is still connected with the front housing FH, i.e. by two mechanical pawls engaging corresponding pins or by hydraulic cylinders. After a required number of wrapping material layers are placed around the bale B, the wrapped bale B is to be ejected out of the baling chamber. For this purpose mechanical connection between the front housing FH and the tailgate Tg is released and the tailgate Tg tilted around the shaft Sh.T, i.e. around a rotation axis being perpendicular to the drawing plane of FIG. 1 and FIG. 2. FIG. 2 shows the apparatus in the bale ejecting mode with the tailgate Tg in an opened position.

The problem may occur that the bale does not drop out of the baling chamber, in particular if the vehicle with the chamber arrangement has a downhill orientation such that the apparatus is on a plane which slops downwards (from left to right in FIG. 2). Thanks to the invention no pusher element or pulling element is required which ejects the wrapped bale B in a direction anti-parallel to the travelling direction F. Nevertheless it is possible to add such a pusher element or a pulling element.

One solution which may be used in the embodiment is to divide the baling chamber—or at least the rear part in the tailgate Tg—in an upper, narrower area and a lower, broader area. The distance between the two rear side wall parts belonging to the tailgate Tg is in the upper area smaller than in the lower area. A bale B is pressed into the upper area. When being tilted upwards into the position shown in FIG. 2, the pivoted narrower area moves the bale B away from the front house FH until the force of gravity makes the bale B dropping onto the ground.

The invention can be combined with this embodiment or can be implemented in an alternative way. In the following a bale forming apparatus according to the invention is described.

This bale forming apparatus also has
- a pick-up PU,
- a cutting and feeding unit FU,
- a wrapping material supplying unit,
- a chamber arrangement comprehending the tailgate Tg and the front housing FH, and
- a plurality of conveying units mounted at the chamber arrangement.

These conveying units come in contact with the loose material and comprehend
- driven rollers with protruding ribs along their circumferential areas and
- bearings for these rollers.

The tailgate Tg and the front housing FH together form a bale chamber with fixed dimension if the bale forming apparatus is operated in the bale forming mode.

FIG. 3 shows schematically a bale forming apparatus implementing the invention in a bale ejecting mode. One conveying unit pCU serving as the adjacent conveying unit is mounted at the tailgate Tg and engages into a receiving aperture Ap.W in the circumferential wall part of the front housing FH while the baler is operated in the bale forming mode. The adjacent conveying unit pCU is pivoted or shifted out of this receiving aperture Ap.W if the baler is transferred into the bale ejecting mode which is shown in FIG. 3. The adjacent conveying unit pCU and a further conveying unit fCU belong to a conveying arrangement CA which is described in detail below. The receiving aperture Ap.W extends from sidewall to sidewall in a direction perpendicular to the drawing plane of FIG. 3.

FIG. 4 to FIG. 6 show the chamber arrangement of the embodiment. FIG. 7 and FIG. 8 show a conveying arrangement being part of this chamber arrangement and comprising the adjacent conveying unit pCU.

The parts of the chamber arrangement are at first explained with reference to FIG. 4 which shows the tailgate Tg in an intermediate position between the bale forming position and the bale ejecting position. The tailgate Tg comprises
- a wall part WP.T which is part of the circumferential wall of the baling chamber arrangement, a left side wall Sw.l,
a right side wall Sw.r, and
a plurality of conveying units comprising driven rollers.

Among these conveying units are the conveying units pCU, fCu and CU.x.

The front housing FH also has
a wall part WP.F (only partly shown),
two side walls, and
several conveying units, among them the conveying unit CU.2.

The respective roller of every conveying unit is rotatable mounted into the two side walls by means of bearings. In the embodiment a lateral teethed wheel on the rotatable roller axis rotates the rollers. The tailgate chain Ch.T at the left side wall Sw.l is guided around the wheel W.T and rotates the teethed walls of all conveying units of the tailgate Tg—with the exception of the conveying unit pCU. A front housing chain Ch.F is guided around the wheel W.F and rotates the teethed wheels of all conveying units of the front housing FH. Both endless chains Ch.T, Ch.F are driven by means of a further endless chain (not shown). It is also possible that some or all conveying units are rotated by electrical motors.

A power shaft PS is coupled with the power take-off shaft of a pulling tractor or other vehicle and rotates. This power shaft PS drives the further endless chain. The driven further endless chain drives the two chains Ch.F, Ch.T.

In the embodiment one conveying unit denoted as pCU operates as the adjacent conveying unit and is pivotally mounted at the tailgate Tg. It is also possible to use several pivotally mounted conveying units or to mount one conveying unit pivotally at the front housing FH. The invention can also be implemented with an adjacent conveying unit pCU which is not pivotally mounted with respect to the tailgate Tg but can only rotate around its own rotating axis.

In the embodiment the pivotally mounted adjacent conveying unit pCU and a further conveying unit fCU are part of a conveying arrangement CA. This conveying arrangement CA is connected with the tailgate Tg and can be pivoted, in the embodiment rotated, around a pivoting axis PA. This pivoting axis PA is parallel to the parallel rotational axes of all driven rollers of the conveying units and perpendicular to the travelling direction F. In the embodiment the pivoting axis PA is identical with the rotational axis of the further conveying unit fCU. Pivoting the conveying arrangement CA pivots the pivotally mounted conveying unit pCU between a bale forming position and a bale releasing position.

The two conveying units pCU, fCU are mounted into a holding arrangement belonging to the conveying arrangement CA. This holding arrangement comprises two holding levers (a left holding lever and a right holding lever) which hold the two conveying units pCU, fCU by means of four bearings. Every holding lever comprises two outer lever arms and two inner lever arms whereby the terms "outer" and "inner" refer to the pivoting axis PA. The two outer lever arms LA.l.o, LA.r.o together carry the pivotally mounted conveying unit pCU. The two conveying units pCU, fCU can rotate around their respective rotating axis with respect to the holding arrangement and are held by suitable bearings. The two inner arms are connected with two tensioning elements Sp.l, Sp.r. These two tensioning elements Sp.l, Sp.r are connected with the two side walls Sw.l, Sw.r of the tailgate Tg. In the embodiment the tensioning elements Sp.l, Sp.r are implemented as pulling springs which pull at the inner lever arms LA.l.i, LA.r.i. By pulling at the inner lever arms LA.l.i, LA.r.i the tensioning elements Sp.l, Sp.r exert a torque onto the conveying arrangement CA which aims to pivot the conveying arrangement CA away from the front housing FH. In FIG. 4 a left pulling spring Sp.l is shown which connects the left inner lever arm LA.l.i with the left side wall Sw.l. The tensioning elements Sp.l, Sp.r can also be implemented as pushing springs or hydraulic or pneumatic elements with pistons.

FIG. 4 also shows the left outer lever arm LA.l.o of the left holding lever and the right outer lever arm LA.r.o of the right holding lever. The right inner lever arm LA.r.i is behind the right side wall Sw.r.

A left holding element HE.l and a right holding element HE.r (in the view of FIG. 4 covered by the front housing FH) together form a holding unit which holds the pivotally mounted conveying unit pCU when the baler is in the bale forming position. The holding unit further inhibits an undesired pivotal movement of the conveying arrangement CA as long as the bale forming apparatus is in the bale forming mode and the conveying arrangement CA is in the bale forming position. The two holding elements HE.l, HE.r each have the form of an L. A left sloping guiding surface GS.l is mounted on the shorter beam of the L of this left holding element HE.l. The right holding element HE.r has a corresponding right guiding surface (not shown).

The wall part WP.F belonging to the front housing FH has a wall aperture Ap.W in the form of a rectangle. This rectangle extends along the entire width of the circumferential wall, i.e. from sidewall to sidewall. This aperture Ap.W belongs to the ejecting aperture which is formed when the bale forming apparatus is operated in the bale ejecting mode and a bale has to be ejected. The wall aperture Ap.W increases this ejecting aperture.

Two further apertures Ap.l, Ap.r are inserted into the two side walls of the front housing FH. These two side wall apertures Ap.l, Ap.r enable the pivotally mounted conveying unit pCU to be moved into the holding elements HE.l, HE.r. In FIG. 4 a left side wall aperture Ap.l is shown. This aperture Ap.l is located above the left guiding surface GS.l. The wall aperture Ap.W and the further apertures Ap.l, Ap.r in the front housing FH together provide a space into which the pivotally mounted conveying unit pCU in the bale forming position engages.

As can be seen in FIG. 4, the chain Ch.T of the tailgate Tg rotates all conveying units of the tailgate Tg with exception of the pivotally mounted conveying unit pCU. If the chain Ch.T were also guided around the pivotally mounted conveying unit pCU, the conveying arrangement CA could not be pivoted properly. All other conveying units (with exception of the adjacent conveying unit pCU) have a teethed wheel at the left side (seen in the travelling direction F) whereas the pivotally mounted conveying unit pCU and the further conveying unit fCU each have a teethed wheel on the right side (hidden in FIG. 4). The mechanism to drive the pivotally mounted conveying unit pCU will be explained later with reference to FIG. 7.

FIG. 5 shows the chamber arrangement of FIG. 4 when operated in the bale forming mode. For sake of clarity the wall part WP.F of the front housing FH is not shown. The tailgate Tg is coupled with the front housing FH by means of two pawls engaging two corresponding pins (not shown in FIG. 5). The tailgate Tg and therefore the conveying arrangement CA with the pivotally mounted conveying unit pCU are in the bale forming position. The pivotally mounted conveying unit pCU is held by the holding unit with the left holding element HE.l and the right holding element HE.r (not shown). The two guiding surfaces GS.l, GS.r are slightly sloping upwards in the travelling direction F. When pivoting the conveying arrangement CA into the bale forming position, the guiding surfaces GS.l, GS.r slightly raises the pivotally mounting conveying unit pCU and rotates the conveying arrangement CA around the axis PA against the force of the two pulling springs Sp.l, Sp.r. This implementation further prevents an undesired movement of the conveying arrangement CA.

FIG. 6 shows the chamber arrangement of FIG. 5 when the baler is operated in the bale ejecting mode. The tailgate Tg is opened as much as possible what is effectuated by hydraulic cylinders or an alternative suitable pivoting means. By pivoting the tailgate Tg around the axis Sh.T, the conveying arrangement CA is pivoted away from the front housing FH. The pivotally mounted conveying unit pCU is pulled away from the holding unit HE.l, HE.r and out of the receiving aperture Ap.W. The conveying arrangement CA is pivoted away from the front housing FH into the bale ejecting position.

In the embodiment this pivotal movement into the bale ejecting position is exerted on the one hand by the two pulling springs Sp.l, Sp.r which pull at the inner lever arms LA.l.i, LA.r.i. On the other hand the force of gravity exerted by the bale B in the bale forming chamber urges from above onto the pivotally mounted conveying unit pCU and supports the step of pivoting away as soon as the pivotally mounted conveying unit pCU is no longer supported by the holding unit HE.l, HE.r. Its own weight also pivots the conveying arrangement CA if it is no longer supported by the holding unit.

As can be seen in FIG. 6 an ejecting aperture for ejecting the bale out of the bale forming chamber is formed. The wall aperture Ap.W in the bottom area of the wall part WP.F (not shown in FIG. 6) is part of this ejecting aperture. A bale B is dropped out of the chamber even in case of downhill position of the bale forming apparatus. The pulling springs Sp.l, Sp.r and its own weight inhibits the conveying arrangement CA from pivoting back towards the front housing FH as long as the tailgate Tg is completely open and the apparatus is in the bale ejecting mode.

FIG. 7 shows the conveying arrangement CA in detail. The right hand side shows to the reader. The bale forming apparatus travels from left to right. The tailgate Tg (not shown) is in the left side of the figure, the front housing FH at the right side. FIG. 7 shows:

the pivotally mounted conveying unit pCU and the further conveying unit fCU, both comprehending conveying rollers with protrusions (longitudinal ribs),
the pivoting axis PA of the conveying arrangement CA which coincides with the rotational axis of the roller of the further conveying unit fCU,
the two outer lever arms LA.r.o, LA.l.o carrying the pivotally mounted conveying unit pCU,
the two inner lever arms LA.r.i, LA.l.i,
the two pulling springs Sp.l, Sp.r mounted at the two inner lever arms LA.r.o, LA.l.i.

In FIG. 7 several protrusions Pr having the form of traversal ribs are shown.

FIG. 7 further shows the mechanism how the pivotally mounted conveying unit pCU of the embodiment is driven. The further conveying unit fCU has one teethed wheel (not shown) at the left hand side which is driven by the chain Ch.T driving all tailgate conveying units besides pCU. The teethed wheel TW.fCU is mounted at the right side of the further conveying unit fCU, the teethed wheel TW.pCU at the right side of the adjacent conveying unit PCU. The further chain Ch.C is guided around the teethed wheels TW.fCU and TW.pCU. These two teethed wheels TW.fCU and TW.pCU are mounted at the right hand side of the conveying arrangement CA. The further conveying unit fCU has therefore two lateral teethed wheels.

The chain Ch.C is stretched by the chain stretching element CSE which has the form of a beam with elliptical front sides and which is pivotally mounted at the holding arrangement. PA.CSI denotes the pivoting (rotating) axis of the chain stretching element CSE. The chain Ch.C and the chain stretching element CSE belong to the conveying arrangement CA. The tailgate chain Ch.T drives all conveying units of the tailgate Tg including the further conveying unit fCU with exception of the pivotally mounted conveying unit pCU via the left hand side teethed wheels. The rotating further conveying unit fCU drives the chain Ch.C as being rotated via the right hand side teethed wheel TW.fCU. The chain Ch.C drives the pivotally mounted conveying unit pCU via the teethed wheel TW.pCU.

In place of a chain Ch.C a further teethed wheel (not shown) can connect the teethed wheels TW.fCU and TW.pCU. This further teethed wheel is also mounted at the right outer lever arm LA.ro and is rotatable around an axis being parallel to the axis PA and PA.CSE.

FIG. 8 shows the chamber arrangement in the bale forming position from below. In contrast to FIG. 1 to FIG. 6 and like FIG. 7, FIG. 8 shows the baler in the travelling direction F from left to right. The tailgate Tg is in the left part of FIG. 8 and the front housing FH in the right part. The reader looks from the right hand side and from below onto the baler. The circumferential wall is not shown. The conveying arrangement CA is in the bale forming position. The holding unit with the right holding element HE.r and the left holding element HE.l (not shown in FIG. 8) holds a pivotally mounted conveying unit pCU. The wall aperture Ap.W is shown schematically.

Reference signs used in the claims will do not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| Ap.l | aperture in the left side wall of the front housing FH |
| Ap.W | receiving aperture in the wall part WP.F of the circumferential wall of the front housing FH |
| B | bale of agricultural material M in the chamber, is wrapped into the net N |
| CA | conveying arrangement with the pivotally mounted conveying unit pCU, the further conveying unit fCU and the holding arrangement with the lever arms |
| Ch.C | chain for driving the pivotally mounted conveying unit pCU, part of the conveying arrangement CA |
| Ch.F | chain for driving the conveying units mounted at the circumferential wall part WP.F of the front housing FH |

-continued

LIST OF REFERENCE SIGNS

| | |
|---|---|
| Ch.T | chain for driving the conveying units mounted at the circumferential wall part WP.T of the tailgate Tg |
| CSE | rotatable chain stretching element for stretching the chain Ch.C |
| CU.1, CU.2 | conveying units mounted at the front housing FH |
| CU.x | other conveying unit mounted at the tailgate Tg |
| F | travelling direction of the bale forming apparatus |
| fCU | further conveying unit, belongs to the conveying arrangement CA, drives the adjacent conveying unit pCU |
| FH | front housing, serves as the fixed chamber part and as the other chamber part with the receiving aperture |
| FU | cutting and feeding unit |
| GS.l | left guiding surface of the holding unit, mounted at the left holding element HE.l |
| GS.r | right guiding surface of the holding unit, mounted at the right holding element HE.r |
| HE.l | left holding element for the pivotally mounted conveying unit pCU, comprises the left guiding surface GS.l, belongs to the holding unit |
| HE.r | right holding element for the pivotally mounted conveying unit pCU, comprises the right guiding surface GS.l, belongs to the holding unit |
| LA.l.i | left inner lever arm of the holding arrangement belonging to the conveying arrangement CA |
| LA.l.o | left outer lever arm of the holding arrangement belonging to the conveying arrangement CA |
| LA.r.i | right inner lever arm of the holding arrangement belonging to the conveying arrangement CA |
| LA.r.o | right outer lever arm of the holding arrangement belonging to the conveying arrangement CA |
| M | agricultural loose material conveyed into the bale forming chamber |
| N | net wrapped around the bale B |
| PA | pivoting axis of the conveying arrangement CA, also the rotating axis of the further conveying unit fCU |
| PA.CSE | pivoting axis of the rotatable chain stretching element CSE |
| pCU | pivotally mounted conveying unit, belongs to the conveying arrangement CA, serves as the adjacent conveying unit |
| PS | power shaft of the baler |
| Pr | protruding rib at the pivotally mounted conveying unit pCU |
| Sh.F | shaft for driving the chain Ch.F |
| Sh.T | shaft for driving the chain Ch.T, coincides with the pivoting axis of the tailgate Tg |
| Sp.l | pulling spring at the left side wall SW.l for pivoting the conveying arrangement CA, mounted at the left inner lever arm LA.l.i |
| Sp.r | pulling spring at the right side wall SW.r for pivoting the conveying arrangement CA, mounted at the right inner lever arm LA.r.i |
| SW.l | left side wall part, belongs to the tailgate Tg |
| SW.r | right side wall part, belongs to the tailgate Tg |
| Tg | tailgate; serves as the movable chamber part carrying the adjacent conveying unit pCU |
| TW.fCU | teethed wheel of the further conveying unit fCU, drives the chain Ch.C |
| TW.pCU | teethed wheel of the pivotally mounted conveying unit pCU, driven by the chain Ch.C |
| WP.F | part of the circumferential wall which belongs to the front housing FH |
| WP.T | part of the circumferential wall which belongs to the tailgate Tg |
| W.F | wheel on the shaft Sh.F |
| W.T | wheel on the shaft Sh.T |

The invention claimed is:

1. A bale forming apparatus for forming a round bale from loose material, the bale forming apparatus comprising:
a baling chamber arrangement, the baling chamber arrangement having two side walls and a circumferential wall extending between the two side walls; and
a plurality of conveying units for conveying the loose material along the circumferential wall of the baling chamber arrangement,
wherein the conveying units are mounted at the baling chamber arrangement and the baling chamber arrangement is divided into a fixed chamber part and a movable chamber part, and the movable chamber part is pivotally mounted and can be pivoted with respect to the fixed chamber part,
wherein the bale forming apparatus is adapted to be operated in a bale forming mode and for being transferred from the bale forming mode to a bale ejecting mode such that the fixed chamber part and the movable chamber part together surround a forming bale in a bale forming chamber and the conveying units convey the material in the forming baling chamber arrangement when the bale forming apparatus is operated in the bale forming mode and the movable chamber part is pivoted away from the fixed chamber part such that an ejecting aperture for ejecting the bale out of the bale forming chamber is formed when the bale forming apparatus is transferred to the bale ejecting mode,
wherein at least one conveying unit belonging to the plurality of conveying units is mounted at the movable chamber part, extending from one side wall of the two side walls to the other side wall, of the two side walls, and is arranged adjacent to the fixed chamber part, wherein the fixed chamber part comprises a receiving aperture adjacent to an edge of the movable chamber part, the receiving aperture extends from one side wall to the other side wall in a plane, the plane being horizontal or sloping angularly downwards at least after the bale forming apparatus is transferred to the bale ejecting mode, wherein the bale forming apparatus is arranged such that the adjacent conveying unit engages into the receiving aperture if the bale forming apparatus is operated in the bale forming mode, the bale forming apparatus is further arranged such that transferring the bale forming apparatus to the bale ejecting mode shifts or pivots the adjacent conveying unit out of the receiving aperture such that the receiving aperture becomes a part of the ejecting aperture, wherein the adjacent conveying unit is mounted at the movable chamber part such that the adjacent conveying unit can be pivoted with respect to the movable chamber part between a bale forming position in which the pivotally mounted adjacent conveying unit engages into the receiving aperture and contributes to conveying the loose material in the bale forming chamber and a bale releasing position in which the pivotally mounted adjacent conveying unit is positioned beside the ejecting aperture, and wherein the pivotally mounted adjacent conveying unit is arranged such that pivoting the pivotally mounted adjacent conveying unit from the bale forming position to the bale releasing position increases a distance between the pivotally mounted adjacent conveying unit and the fixed chamber part, and wherein the bale forming apparatus further comprises a tensioning unit, and the tensioning unit is arranged for exerting a tension directed to pivot the pivotally mounted adjacent conveying unit to the bale releasing position.

2. The bale forming apparatus according to claim 1, wherein the bale forming apparatus is adapted for being transferred back from the bale ejecting mode to the bale forming mode and the bale forming apparatus is arranged such that transferring the bale forming apparatus from the bale forming mode to the bale ejecting mode causes the pivotally mounted adjacent conveying unit to be pivoted from the bale forming position to the bale releasing position such that the pivotally mounted adjacent conveying unit is pivoted out of the receiving aperture and transferring the bale forming apparatus from the bale ejecting mode back to the bale forming mode causes the pivotally mounted adjacent conveying unit to be pivoted from the bale releasing position to the bale forming position such that the pivotally mounted adjacent conveying unit engages into the receiving aperture.

3. The bale forming apparatus according to claim 1, wherein the bale forming apparatus is arranged such that a weight of the bale in the bale forming chamber contributes to pivoting the pivotally mounted adjacent conveying unit to the bale releasing position when the bale forming apparatus is transferred to the bale ejecting mode.

4. The bale forming apparatus according to claim 1, wherein the bale forming apparatus is adapted such that the adjacent conveying unit and the receiving aperture are below the forming bale in the bailing chamber arrangement if the bale forming apparatus is operated in the bale forming mode.

5. The bale forming apparatus according to claim 1, wherein the circumferential wall is divided into a fixed wall part belonging to the fixed chamber part and a movable wall part belonging to the movable chamber part, wherein each of the two side walls comprise a side wall part belonging to the fixed chamber part and a further side wall part belonging to the movable chamber part, wherein the receiving aperture comprises a wall aperture, the wall aperture being in the wall part of the fixed chamber part and extending between the two sidewall parts of the fixed chamber part, and wherein the bale forming apparatus is arranged such that the adjacent conveying unit engages into the wall aperture when the bale forming apparatus is in the bale forming mode and is pivoted out of the wall aperture when the bale forming apparatus is transferred to the bale ejecting mode.

6. The bale forming apparatus according to claim 1, wherein the bale forming apparatus comprises a conveying arrangement, the conveying arrangement comprising:
the adjacent conveying unit;
a further conveying unit also belonging to the plurality of conveying units; and
a holding arrangement for the adjacent conveying unit and the further conveying unit.

7. The bale forming apparatus according to claim 6, wherein the conveying arrangement is pivotally mounted at the moveable chamber part and is pivotal between the bale forming position and the bale releasing position such that the adjacent conveying unit engages into the receiving aperture if the conveying arrangement is in the bale forming position.

8. The bale forming apparatus according to claim 6, wherein the conveying arrangement further comprises a transmission unit,
wherein the transmission unit transfers a movement of the further conveying unit to the adjacent conveying unit.

9. The bale forming apparatus according to claim 1, wherein the fixed chamber part comprises a holding unit, and wherein the holding unit is adapted for holding the adjacent conveying unit when the adjacent conveying unit engages into the receiving aperture and releasing the adjacent conveying unit when the adjacent conveying unit is pivoted or shifted out of the receiving aperture.

10. The bale forming apparatus according to claim 9, wherein the bale forming apparatus is adapted for being transferred back from the bale ejecting mode to the bale forming mode, the bale forming apparatus being arranged such that transferring the bale forming apparatus to the bale forming mode causes the adjacent conveying unit to shift to the receiving aperture, and wherein the holding unit comprises at least one guiding element, the guiding element being adapted for guiding the adjacent conveying unit when the adjacent conveying unit is shifted into the receiving aperture.

11. The bale forming apparatus according to claim 9, wherein each of the two side walls comprises a side wall part belonging to the fixed chamber part, the receiving aperture extends between the two side wall parts belonging to the fixed chamber part, and the holding unit comprises two holding unit parts, wherein a first holding unit part of the two holding unit parts is mounted in a first side wall part of the two side wall parts and a second holding unit part of the two holding unit parts is mounted in a second side wall part of the two side wall parts such that the adjacent conveying unit is held from two sides by the two holding unit parts when the adjacent conveying unit engages into the receiving aperture.

12. The bale forming apparatus according to claim 1, wherein the bale forming apparatus is a part of a vehicle movable to a travelling direction and the plane in which the receiving aperture extends is horizontal or is sloping angularly downwards when viewed in a direction opposite to the travelling direction at least while the bale forming apparatus is operated in the bale ejecting mode.

13. A bale forming apparatus for forming a round bale from loose material, the bale forming apparatus comprising:
a baling chamber arrangement, the baling chamber arrangement having two side walls and a circumferential wall extending between the two side walls; and
a plurality of conveying units for conveying the loose material along the circumferential wall of the baling chamber arrangement,
wherein the conveying units are mounted at the baling chamber arrangement and the baling chamber arrangement is divided into a fixed chamber part and a movable chamber part, and the movable chamber part is pivotally mounted and can be pivoted with respect to the fixed chamber part,
wherein the bale forming apparatus is adapted to be operated in a bale forming mode and transferred from the bale forming mode to a bale ejecting mode such that the fixed chamber part and the moveable chamber part together surround a forming bale in a bale forming chamber and the conveying units convey the material in the baling chamber arrangement when the bale forming apparatus is operated in the bale forming mode and the movable chamber part is pivoted away from the fixed chamber part such that an ejecting aperture for ejecting the bale out of the bale forming chamber is formed when the bale forming apparatus is transferred to the bale ejecting mode,
wherein at least one conveying unit belonging to the plurality of conveying units is mounted at the movable chamber part, extending from one side wall of the two side walls to the other side wall of the two side walls, and is arranged adjacent to the fixed chamber part,
wherein the fixed chamber part comprises a receiving aperture adjacent to an edge of the movable chamber part, the receiving aperture extends from the one side wall to the other side wall in a plane, the plane being horizontal or sloping angularly downwards at least after the bale forming apparatus is transferred to the bale ejecting mode,
wherein the bale forming apparatus is arranged such that the adjacent conveying unit engages into the receiving aperture if the bale forming apparatus is operated in the bale forming mode, the bale forming apparatus is further arranged such that transferring the bale forming apparatus to the bale ejecting mode shifts or pivots the adjacent conveying unit out of the receiving aperture such that the receiving aperture becomes a part of the ejecting aperture,
a conveying arrangement, the conveying arrangement comprising:
the adjacent conveying unit;
a further conveying unit also belonging to the plurality of conveying units; and
a holding arrangement for the adjacent conveying unit and the further conveying unit,
wherein the further conveying unit comprises a rotating conveying element, the conveying arrangement being mounted at the moveable chamber part such that the conveying arrangement can be pivoted with respect to the moveable chamber part around a pivoting axis, and the conveying arrangement being mounted such that a rotation axis of the rotating conveying element of the further conveying unit coincides with the pivoting axis of the pivotally mounted conveying arrangement.

14. The bale forming apparatus according to claim 13, wherein the adjacent conveying unit is mounted at the movable chamber part such that the adjacent conveying unit can be pivoted with respect to the movable chamber part between a bale forming position in which the pivotally mounted adjacent conveying unit engages into the receiving aperture and contributes to conveying the loose material in the bale forming chamber and a bale releasing position in which the pivotally mounted adjacent conveying unit is positioned beside the ejecting aperture, and
wherein the pivotally mounted adjacent conveying unit is arranged such that pivoting the pivotally mounted adjacent conveying unit from the bale forming position to the bale releasing position increases a distance between the pivotally mounted adjacent conveying unit and the fixed chamber part.

15. The bale forming apparatus according to claim 14, wherein the bale forming apparatus is adapted for being transferred back from the bale ejecting mode to the bale forming mode and the bale forming apparatus is arranged such that transferring the bale forming apparatus from the bale forming mode to the bale ejecting mode causes the pivotally mounted adjacent conveying unit to be pivoted from the bale forming position to the bale releasing position such that the pivotally mounted adjacent conveying unit is pivoted out of the receiving aperture and transferring the bale forming apparatus from the bale ejecting mode back to the bale forming mode causes the pivotally mounted adjacent conveying unit to be pivoted from the bale releasing position to the bale forming position such that the pivotally mounted adjacent conveying unit engages into the receiving aperture.

16. The bale forming apparatus according to claim 14, wherein the bale forming apparatus is arranged such that a weight of the bale in the bale forming chamber contributes to pivoting the pivotally mounted adjacent conveying unit to the bale releasing position when the bale forming apparatus is transferred to the bale ejecting mode.

17. The bale forming apparatus according to claim 13, wherein the bale forming apparatus is adapted such that the adjacent conveying unit and the receiving aperture are below the forming bale in the bailing chamber arrangement if the bale forming apparatus is operated in the bale forming mode.

18. The bale forming apparatus according to claim 13, wherein the circumferential wall is divided into a fixed wall part belonging to the fixed chamber part and a movable wall part belonging to the movable chamber part,
wherein each of the two side walls comprise a side wall part belonging to the fixed chamber part and a further side wall part belonging to the movable chamber part,
wherein the receiving aperture comprises a wall aperture, the wall aperture being in the wall part of the fixed chamber part and extending between the two sidewall parts of the fixed chamber part, and
wherein the bale forming apparatus is arranged such that the adjacent conveying unit engages into the wall aperture when the bale forming apparatus is in the bale forming mode and is pivoted out of the wall aperture when the bale forming apparatus is transferred to the bale ejecting mode.

19. The bale forming apparatus according to claim 13, wherein the conveying arrangement is pivotally mounted at the moveable chamber part and is pivotal between a bale forming position and a bale releasing position such that the adjacent conveying unit engages into the receiving aperture if the conveying arrangement is in the bale forming position.

20. The bale forming apparatus according to claim 13, wherein the conveying arrangement further comprises a transmission unit, wherein the transmission unit transfers a movement of the further conveying unit to the adjacent conveying unit.

21. The bale forming apparatus according to claim 13, wherein the fixed chamber part comprises a holding unit, and wherein the holding unit is adapted for holding the adjacent conveying unit when the adjacent conveying unit engages into the receiving aperture and releasing the adjacent conveying unit when the adjacent conveying unit is pivoted or shifted out of the receiving aperture.

22. The bale forming apparatus according to claim 21, wherein the bale forming apparatus is adapted for being transferred back from the bale ejecting mode to the bale forming mode, the bale forming apparatus being arranged such that transferring the bale forming apparatus to the bale forming mode causes the adjacent conveying unit to shift to the receiving aperture, and wherein the holding unit comprises at least one guiding element, the guiding element being adapted for guiding the adjacent conveying unit when the adjacent conveying unit is shifted into the receiving aperture.

23. The bale forming apparatus according to claim 21, wherein each of the two side walls comprises a side wall part belonging to the fixed chamber part, the receiving aperture extends between the two side wall parts belonging to the fixed chamber part, and the holding unit comprises two holding unit parts, wherein a first holding unit part of the two holding unit parts is mounted in a first side wall part of the two side wall parts and a second holding unit part of the two holding unit parts is mounted in a second side wall part of the two side wall parts such that the adjacent conveying unit is held from two sides by the two holding unit parts when the adjacent conveying unit engages into the receiving aperture.

24. The bale forming apparatus according to claim 13, wherein the bale forming apparatus is a part of a vehicle movable to a travelling direction and the plane in which the receiving aperture extends is horizontal or is sloping angularly downwards when viewed in a direction opposite to the travelling direction at least while the bale forming apparatus is operated in the bale ejecting mode.

\* \* \* \* \*